United States Statutory Invention Registration [19]

[11] Reg. Number: H26

Dinger [45] Published: Feb. 4, 1986

[54] ADAPTIVE MICROSTRIP ARRAY USING PARASITIC ELEMENTS

[75] Inventor: Robert J. Dinger, Ridgecrest, Calif.

[73] Assignee: The United States of America as represented by the Secretary of the Navy, Washington, D.C.

[21] Appl. No.: 748,073

[22] Filed: Jun. 24, 1985

[51] Int. Cl.[4] ..... H01Q 3/22; H01Q 3/24; H01Q 3/26

[52] U.S. Cl. ..... 343/372

[56] References Cited

U.S. PATENT DOCUMENTS 3,140,490 7/1964 Sichak et al. .
4,065,771 12/1977 Gulick et al. .
4,225,870 9/1980 Marner et al. .
4,280,128 7/1981 Masak .
4,298,873 11/1981 Roberts .
4,334,240 6/1982 Kane ..... 343/797

*Primary Examiner*—Theodore M. Blum
*Attorney, Agent, or Firm*—Robert F. Beers; W. Thom Skeer

[57] ABSTRACT

A plurality of strip-line elements are used as an antenna array. The directivity of the array is controlled by controlling the terminating reactance of the closely-coupled stripline elements.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADAPTIVE MICROSTRIP ARRAY USING PARASITIC ELEMENTS

BACKGROUND OF THE INVENTION

1. Field of the Invention

This invention pertains to field of electronic communication. More particularly, the invention pertains to antenna design. By way of further characterization, this invention pertains to an electronically steerable antenna. By way of further illustration but without limitation thereto, this invention will be described as it pertains to an antenna useful in missile applications.

2. Description of the Prior Art

It is known to use adaptive array antenna arrays to reduce external interference reaching a receiver by shaping the antenna pattern to steer nulls, or minima of sensitivity, in the directions of the interference. This general technique has been in existence for some time. All known adaptive arrays, to date, use weighting on every element followed by an electronic summing network which combines the signal from each of the antenna elements electronically. That is, the signal received by each antenna element is weighted in amplitude and/or phase by means of electronically controlled phase shifters, attenuators, amplifiers, etc. These weighted signals are then summed together to form an array output. This array output is monitored continuously and the weights at each antenna are changed to minimize interference power in the received signal.

Although satisfactory for many purposes, adaptive arrays of the known type encounter problems when the number of elements of the array are spaced closely to each other, less than a one-quarter of a wavelength, due to interaction between the elements. This interaction causes the pattern to vary sensitivity in response to the weight values which in turn limits the depth, width, and the pointing accuracy of the pattern nulls. Such failings have made adaptive array techniques of little value in compact arrangements such as required in the airborne missile arts. Another unfavorable characteristic of the prior art adaptive arrays is the complexity and cost of the weighting circuitry and its correlation loop. Further, this type of construction is complicated by having circuitry for those adaptive arrays that operate at an intermediate frequency. For such arrays an expensive mixing stage is required for each weighted element.

SUMMARY OF THE INVENTION

The invention employs a plurality of antenna elements arranged in a standard array pattern. One of the elements of the pattern is connected directly to the utilization device which, in the illustration examples is a receiver. The remaining elements are each reactively weighted such that the resonance and coupling characteristics of each element may be altered. Each element that is not connected to the receiver is parasitic to the element which is connected to the receiver such that its contribution to the received signal is reflected to the element connected to the receiver. The weighting of each parasitic element is determined by a control circuit which receives an output from the receiver such that constructive or destructive interference can occur between the reflected waves leading to lobes or nulls in the pattern of the sensitivity of the antenna. Such directivity and sensitivity curves are well understood in the antenna design art and will not be discussed in greater detail herein.

It is accordingly an object of this invention to provide an improved receiving system.

A further object of this invention is to provide a light weight, low-cost, steerable antenna array.

Another object of this invention is to provide a reactively steered adaptable array utilizing a minimum of electronic components.

A still further object of this invention is to provide a reactively steered antenna array which may be configured in a microstrip antenna.

These and other objects of the invention will become apparent to those versed in the art and considering the appended description, claims and drawings wherein:

DESCRIPTION OF THE PREFERRED EMBODIMENT

Figure 1:
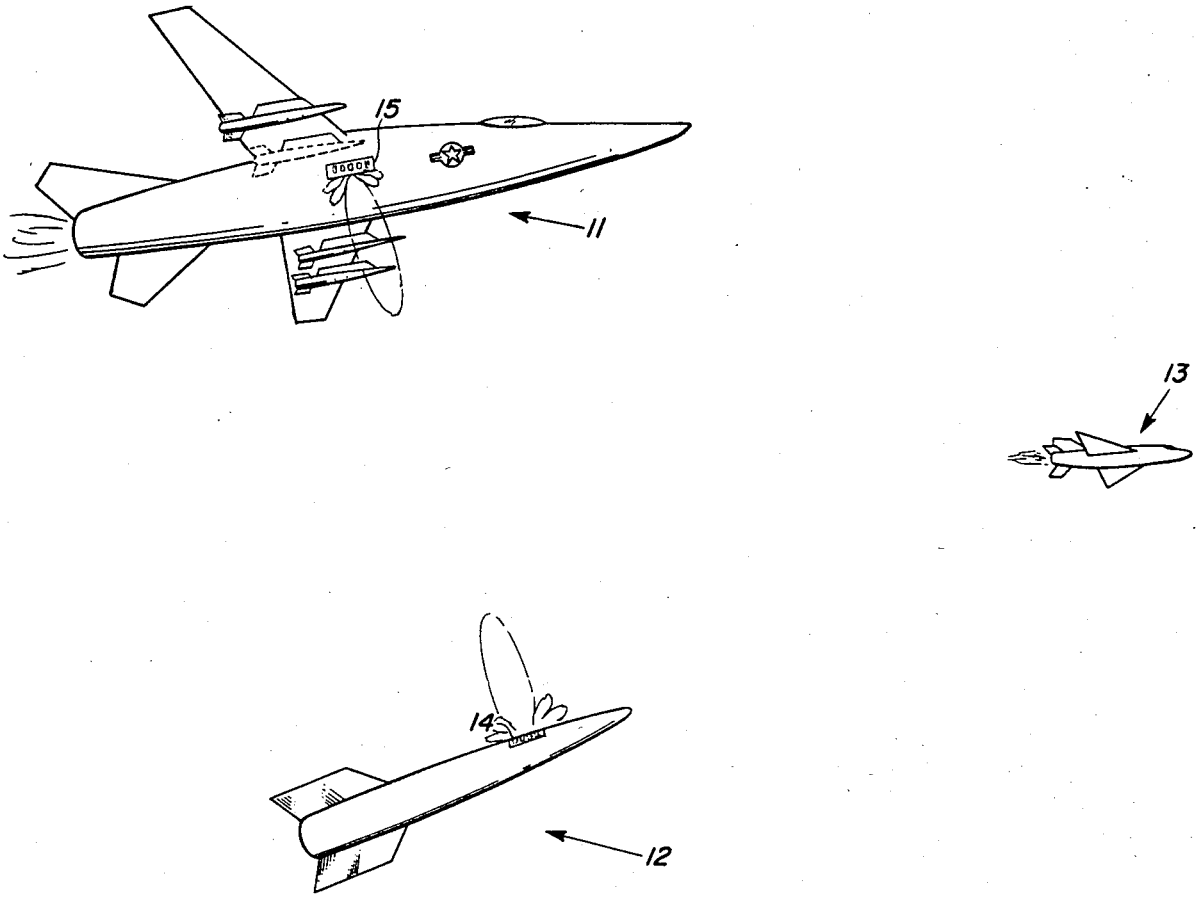
FIG. 1 is an environmental view showing the invention in an operational environment.

Referring to FIG. 1, an aircraft 11 shown in communication with a missile 12 which is headed toward a target 13. Missile 12 has a patch microstrip antenna illustrated at 14. Antenna 14 is in electronic communication with an antenna 15 on aircraft 11. As illustrated, antennas 14 and 15 are electronically steered such that the directivity curves provide for optimum transfer of communication without interference.

Figure 2:
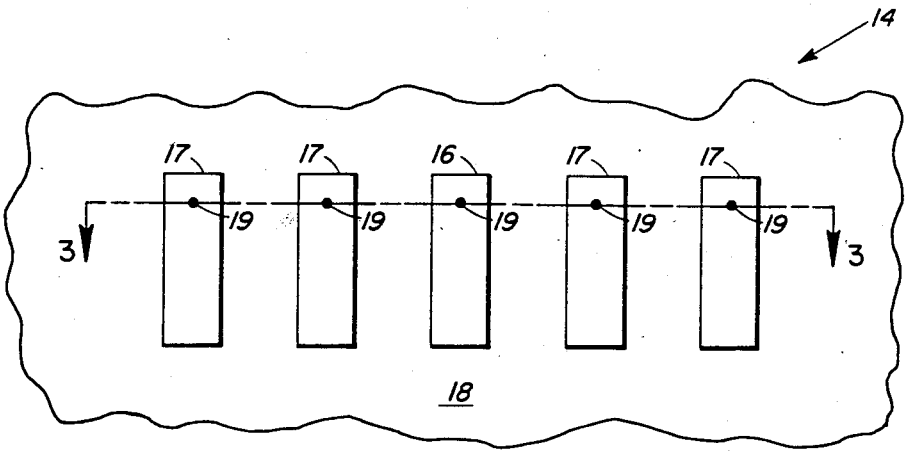
FIG. 2 is a plan view of the antenna according to the invention.

Referring to FIG. 2, antenna 14 is shown in plan view and has a central element 16 and a plurality of parasitic elements 17 spaced therefrom. Elements 16 and 17 are on a dielectric support 18 and have connection points 19 on each element where electrical connection is made thereto. It will be observed that connection points 19 are asymmetric with respect to antenna elements 16 and 17. This asymmetry is to match impedances between the transmission line of associated circuitry. As is well understood this placement may vary if the characteristic impedance of the transmission line differs from the seventy-two ohm configuration, illustrated.

Figure 3:
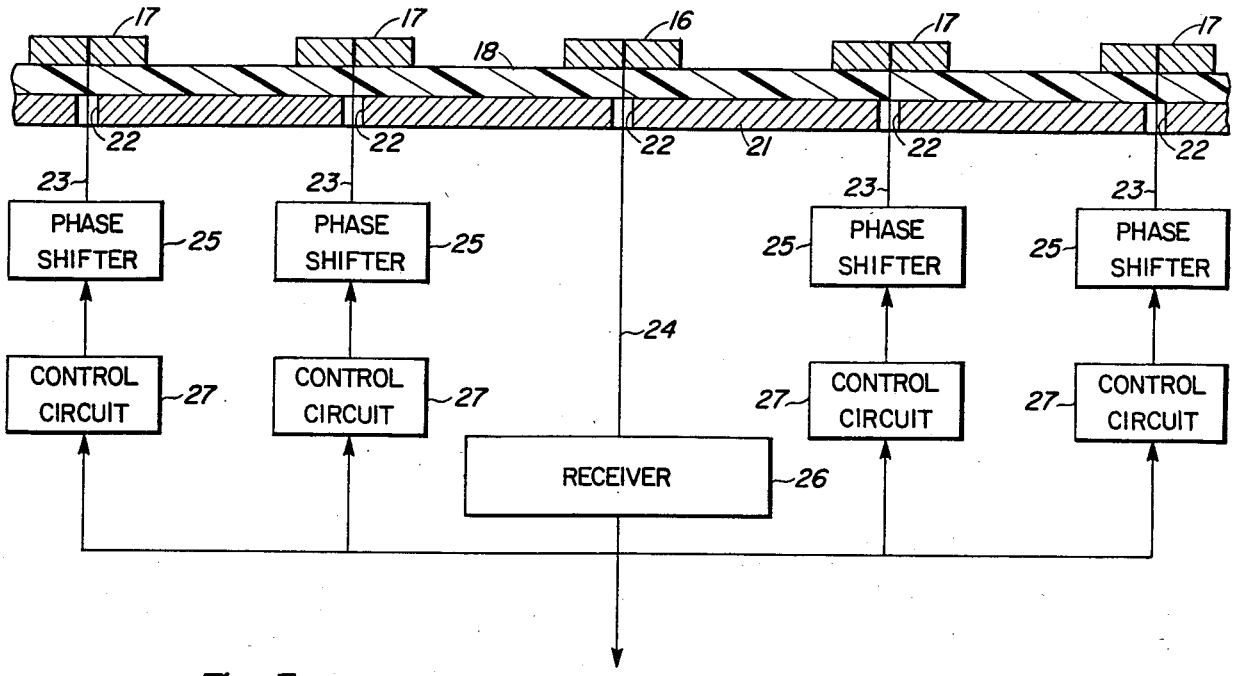
FIG. 3 is a partial sectional view taken along lines 33 with an associated block diagram.

Referring to FIG. 3, it may be seen that on the opposite side of dielectric sheet 18 a ground plane 21 is positioned a form the ground plane of a microstrip assembly. Such microstrips are sometimes termed striplines. Ground plane 21 has a plurality of apertures 22 permitting connector 23 and 24 to be attached to elements 17 and 16 respectively. Connectors 23 connect antenna elements 17 to a phase shifter 25. Phase shifter 25 may be a varactor diode which is a two element electronic device which changes its inductive impedance in response to an applied d.c. voltage. Such devices are well understood in the electronic arts and choice between appropriate ones is made with routine skill by electrical engineers conversant with such circuit design. Element 16 is connected to a receiver 26 which is a conventional RF receiver having an electronic output. The output of receiver 26 goes to other utilization devices but also feeds a plurality of control circuits 27. Controls circuits 27 are each associated with a phase shifter 25 to control the impedance thereof.

Figure 4:
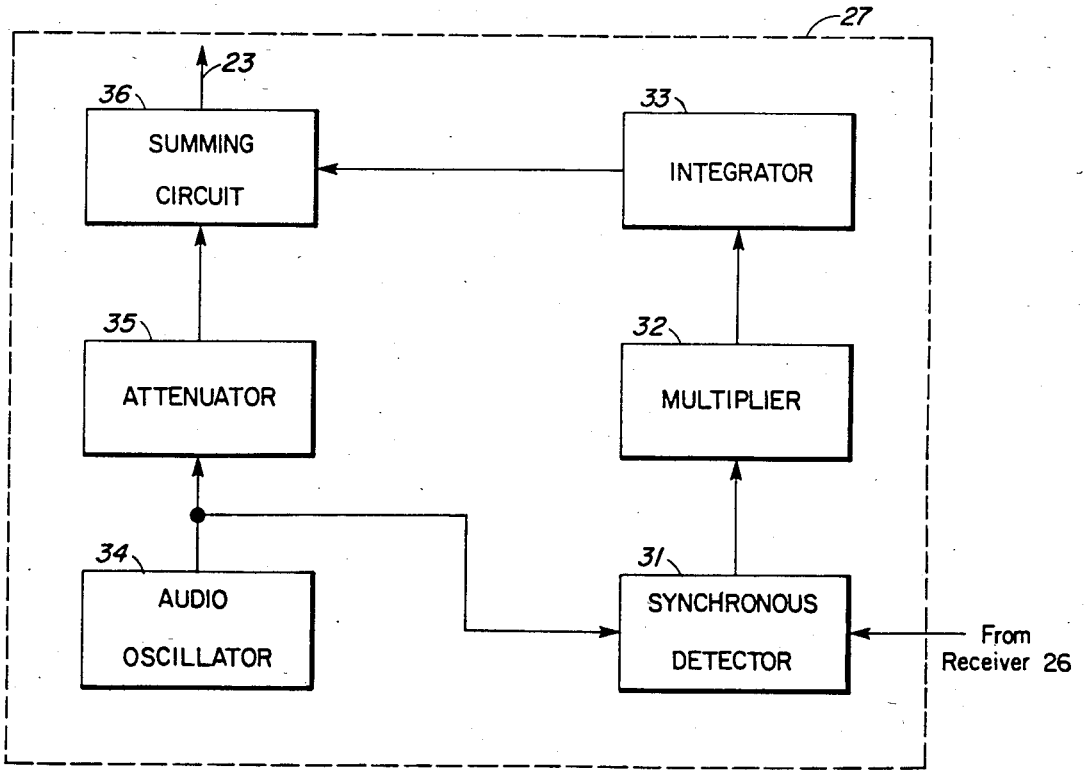
FIG. 4 is a block diagram of the control circuit shown in FIG. 3.

Referring to FIG. 4, the details of control circuits 27 are illustrated. An input from receiver 26 is connected to a synchronous detector 31 which has an output which is connected to a multiplier 32 which has its output connected to an integrator 33. An audio oscillator 34 of conventional design feeds its output to synchronous detector 31 and to an attenuator pad 35. The purpose of attenuator pad 35 is to reduce the voltage to an operational level corresponding to the output of integrator 33 and the output of attenuator 35 and integrator 33 are summed in a summing circuit 36 which may be an op amp and the analog output therefrom is connected to elements 17.

Audio oscillator 34 provides signal to synchronous detector 31 as previously described.

The antenna pattern for the array is formed in accordance to the values of the load impedance determined by the terminating phase shifters 25. Thus, the incident radiation reflected from the various parasitic elements 17 to central element 16 is controlled by the value of the load impedance of phase shifters 25. Receiver 26 sensitive to the total current induced on central antenna element 17 which is produced by the sum of the reflected waves and hence constructive or destructive interference occurs between the reflected waves leading to the lobes and nulls of the antenna directivity curves as are well understood in radiation transfer arts.

Control of the antenna pattern is achieved by the components shown in FIG. 4. Audio oscillator 34 has two functions. It causes the value of the terminating reactance to have a small alternating component impressed upon it which, in turn, produces a corresponding alternating component in the receiver output. This alternating component serves as a reference signal for the synchronous detector 31 and for variations of relatively small magnitude the output of synchronous detector 31 is proportional to the ratio of the change of the output of audio oscillator 34 and the variation in the output from receiver 26.

This output from synch detector 31 is multiplied by a constant which is negative if minimization of the incident output is desired or is positive if maximization is desired. The output from multiplier 32 is an integrated by integrator 33 to produce an error voltage that is used to control the terminating reactants and requires a control circuit 27 to be associated therewith. In the described example, a five element array has been shown. When the array is tuned for a center of 4.0 GHz the illustrated circuit has the ability to steer a null in the pattern toward the source of intereference that has depth of 35 dB relative to the pattern lobes and an angular width of 25 degrees. Such a null has been able to cancel an interference signal as might originate from target 13 or other spurious radiation. A similar gain in the antenna can be steered if the positive multiplier is utilized. The afore described adaptive pattern control has permitted 360 degree steering in closely spaced microstrip antennas and has produced substantial benefits over designs previously used.

What is claimed is:

1. A reactively steered adaptive antenna array comprising:

a plurality of resonant elements arranged in a predetermined pattern;

a utilization device connected to a selected one of said resonant elements having an electrical output;

a plurality of reactively tuneable elements equal in number to the remaining number of resonant elements and connected thereto one reactively tuneable element to each resonant element; and a plurality of control circuits each including a synchronous detector and equal in number to the number of reactively tuneable elements and connected thereto and each control circuit having its synchronous detector connected to the utilization device to receive the electrical output therefrom, whereby the reactively tuneable element causes the resonant element connected to the utilization device signals in a phase controlled manner to effectively steer the directional response of said pattern of resonant elements.

* * * * *